United States Patent [19]

O'Grady

[11] Patent Number: 5,734,443
[45] Date of Patent: Mar. 31, 1998

[54] METHOD AND DEVICE FOR PERFORMING SOURCE TRANSITIONS IN A VIDEO SYSTEM WHICH PERFORMS ENTROPY ENCODING

[75] Inventor: William J. O'Grady, Yonkers, N.Y.

[73] Assignee: Philips Electronics North America Corporation, New York, N.Y.

[21] Appl. No.: 583,147

[22] Filed: Dec. 28, 1995

[51] Int. Cl.[6] ................................. H04N 7/01
[52] U.S. Cl. .................... 348/705; 348/97; 348/401; 348/443; 348/459; 348/526; 386/52
[58] Field of Search ......................... 348/97, 385, 386, 348/387, 443, 459, 526, 700, 705

[56] References Cited

U.S. PATENT DOCUMENTS

| | | | |
|---|---|---|---|
| 4,709,277 | 11/1987 | Ninomiya et al. | 386/52 |
| 5,221,966 | 6/1993 | Clayton et al. | 348/443 |
| 5,255,091 | 10/1993 | Lyon et al. | 348/443 |
| 5,260,787 | 11/1993 | Capitant et al. | 348/459 |
| 5,317,398 | 5/1994 | Casavant et al. | 348/570 |
| 5,339,111 | 8/1994 | Park | 348/524 |
| 5,452,011 | 9/1995 | Martin et al. | 348/526 |
| 5,461,420 | 10/1995 | Yonemitsu et al. | 348/401 |
| 5,517,248 | 5/1996 | Isoda | 348/459 |

OTHER PUBLICATIONS

"Television Engineering Handbook", Benson, Sec. 17–.1–17.7.
"Adaptive Frame/Field Motion Compensated Video Coding" Puri et al, Signal Processing: Image Communication 5 (1993) pp. 39–58.

*Primary Examiner*—Tommy P. Chin
*Assistant Examiner*—Frank Snow
*Attorney, Agent, or Firm*—Laurie E. Gathman

[57] ABSTRACT

A method and device for performing source transitions in a video system which performs entropy encoding such that a transition occurs only after the fields which define a frame picture have been received by the encoder. The method and device also provides arrangement for ensuring that initially after the switch to the second program source consecutive fields of information from the second program source which will be encoded as a frame picture are provided.

22 Claims, 4 Drawing Sheets

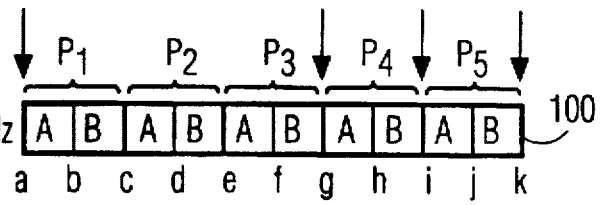
FIG. 1A
PRIOR ART
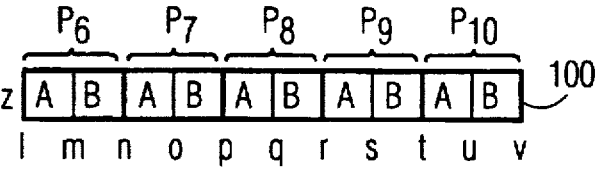
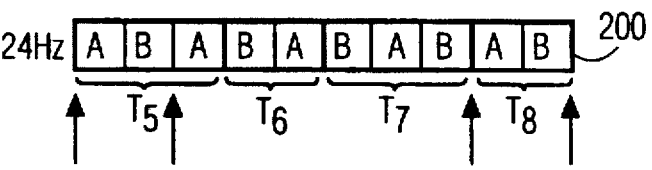
FIG. 1B
PRIOR ART

METHOD AND DEVICE FOR PERFORMING SOURCE TRANSITIONS IN A VIDEO SYSTEM WHICH PERFORMS ENTROPY ENCODING

BACKGROUND OF THE INVENTION

1. Field of the Invention

This invention relates in general to video encoding and in particular to an apparatus and method for switching the input of an encoder from one video source to another video source in an entropy encoding system.

2. Description of the Prior Art

The digital video compression standard developed by the International Standardization Organization's (ISO) Moving Picture Expert Group (MPEG) has become the front runner for selection as a worldwide standard for the delivery of digital video programs over a wide variety of media such as terrestrial broadcasting, telecommunications, direct satellite broadcasting, optical disc, digital video tape and cable.

Video boards for multimedia personal computers have appeared which feature the ability to encode and decode basic MPEG encoded pictures. The MPEG-1 standard represents a video coding syntax which is optimized primarily for coding source video having low resolution (luminance of 360×240) and non-interlaced format at bit-rates of about 1.5 Mbits/s. Video information is delivered on compact discs (CD) in accordance with the MPEG-1 standard. Motion pictures are available in the Video CD format which is also based upon MPEG-1.

In the article "Adaptive Frames/Field Motion Compensated Video Coding" by Puri, Aravind and Haskell, which appeared in *Signal Processing: Image Communication*, 5 (1993) 39–58 Elsevier, the second phase activity of the Motion Picture Experts Group is discussed. This activity is directed at developing an improved MPEG standard, known as MPEG-2, which can be used to code source video having a high resolution from interlaced as well as non-interlaced sources at much higher bit rates. This article is incorporated by reference herein.

In order to create digital television bit streams, sources of program material such as interlaced and non-interlaced video programs and motion pictures are used. These sources of program material are referred to hereinafter interchangeably as "source material" or "program source".

Programming can originate from film which is converted to video by telecines, or it can originate as video from sources such as video cameras. The term film frame is used hereinafter to mean one complete image on film. The term video frame is used hereinafter to mean the information contained in all the scan lines of a video image. Generically these will be referred to as frames.

Video can be in non-interlaced form, for example progressively scanned video from a camera which outputs all scan lines of an image sixty times a second. Video can also be in interlaced form, for example material from cameras which produce NTSC video having thirty frames per second, where each frame contains two interlaced fields. The term field is used hereinafter to mean the information contained in alternate scan lines of the complete set of scan lines of an interlaced video image. A field contains information from either the odd-numbered scan lines or the even-numbered scan lines of the image. In an interlaced video signal, a field is transmitted between two vertical intervals, and a video frame consists of the information contained in two consecutive fields. In a non-interlaced video signal, a video frame is transmitted between two vertical intervals.

MPEG-2 permits encoding of entire video frames which are in interlaced or non-interlaced format. MPEG-2 also permits separate encoding of fields from interlaced sources by using field pictures. The term picture is used hereinafter to refer to a frame or field which is encoded as a unit by an algorithm such as MPEG-2. If an encoded picture is a frame picture, all lines of the frame can be reconstructed from the portion of the encoded bitstream which represents the encoded picture. If an encoded picture is a field picture, only one field can be reconstructed from the portion of the bitstream which represents the encoded picture.

If there is a transition from a non-interlaced source to another source in video input to an MPEG-2 encoder, each video frame contains all the information needed to produce an encoded picture, and the switch can occur in any vertical interval of the non-interlaced source without any serious consequences in encoding efficiency. If the video before the transition is in interlaced form the transition may occur at a point in time which will result in the encoder producing a field picture rather than a frame picture. MPEG-2 requires that field pictures be produced in pairs, so if a field picture is encoded before the transition, then a field picture must be encoded after the transition, even if the first field after the transition could be encoded as part of a frame picture. This results in inefficient MPEG-2 encoding. There is usually a scene change at the transition, and this is when efficient encoding is particularly important.

The current method for performing a transition from an interlaced source to another source in a system which produces entropy-encoded video does not ensure that the transition occurs at a point in time which corresponds to the end of a frame picture in the encoded bitstream.

If there is a transition to a film source which provides non-interlaced video to the input of an MPEG-2 encoder, each video frame contains all the information needed to produce an encoded picture. If the video after the transition is in interlaced form and a lone field is provided rather than all the fields required to encode a frame picture, then a typical MPEG-2 encoder will instead produce field pictures. The field pictures result in inefficient encoding. The current method for performing a transition to interlaced video from a film source in a system which produces entropy-encoded video in fact does not ensure that there are at least two fields from one film frame after the transition.

Since the standard film frame rate of 24 frames per second is less than half the interlaced video field rate of 60 fields per second, the conversion from film to video requires telecine processing in which two film frames are converted to five video fields every 1/12 second. Currently available telecine devices utilize a 3:2 pull-down process to accomplish this. By this process, a converted frame can either include i) three sequential fields (a "three field frame") which are derived from each alternate film frame, or ii) two sequential fields which are derived from each of the remaining film frames. Either of these converted frames will also be referred to generically as a frame. The scan lines in the third field in a three field frame are the same as the scan lines in the first field in the three field frame which makes the third field a redundant field. A complete discussion of telecine devices and the 3:2 pull-down process is discussed in the "Television Engineering Handbook" by Benson, Sec. 17.1 to 17.7. This reference is incorporated by reference herein. The invention provides a method and apparatus for synchronizing the five-field sequence to the encoding process.

SUMMARY OF THE INVENTION

During entropy encoding of video by an algorithm such as MPEG-2, frames of source material are processed to produce encoded pictures. It is important that the transition from an interlaced source to another source occurs at a point in time which will not require the encoder to produce any field pictures before or after the transition. A feature of the invention therefore is to ensure that switching from a first source to a second source occurs at a point in time when the last field received by the encoder prior to the transition is either the second of a pair of fields which can be processed as a frame picture, or a redundant third field in a three field frame.

If the source material after the transition is interlaced video which is supplied by a telecine device in which at least two fields are derived from one film frame, it is important that the first two fields after the transition are derived from one film frame so this frame and subsequent film frames can be encoded as frame pictures. Another feature of the invention therefore is to provide a method and apparatus for frame-start control which ensures that the first two fields of video from a film source which provides program material after the transition are derived from one film frame.

The instant invention provides a method and apparatus for improving encoding efficiency and picture quality at transitions by permitting transitions at preferred times only, and controlling sources such as telecines so they provide to the encoder at least two fields of video from a film frame immediately after a transition.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference will be made to the following drawings:

FIG. 1A shows the available entry points in the prior art for switching from an interlaced program source which provides 30 frames per second and is encoded using frame pictures to a sequence of fields derived from 24-Hz film by a telecine which does not have frame-start control;

FIG. 1B shows the available entry points in the prior art for switching from a sequence of fields derived from 24-Hz film by a telecine to an interlaced program source which provides 30 frames per second;

DETAILED DESCRIPTION OF A PREFERRED EMBODIMENT OF THE INVENTION

Figure 2:
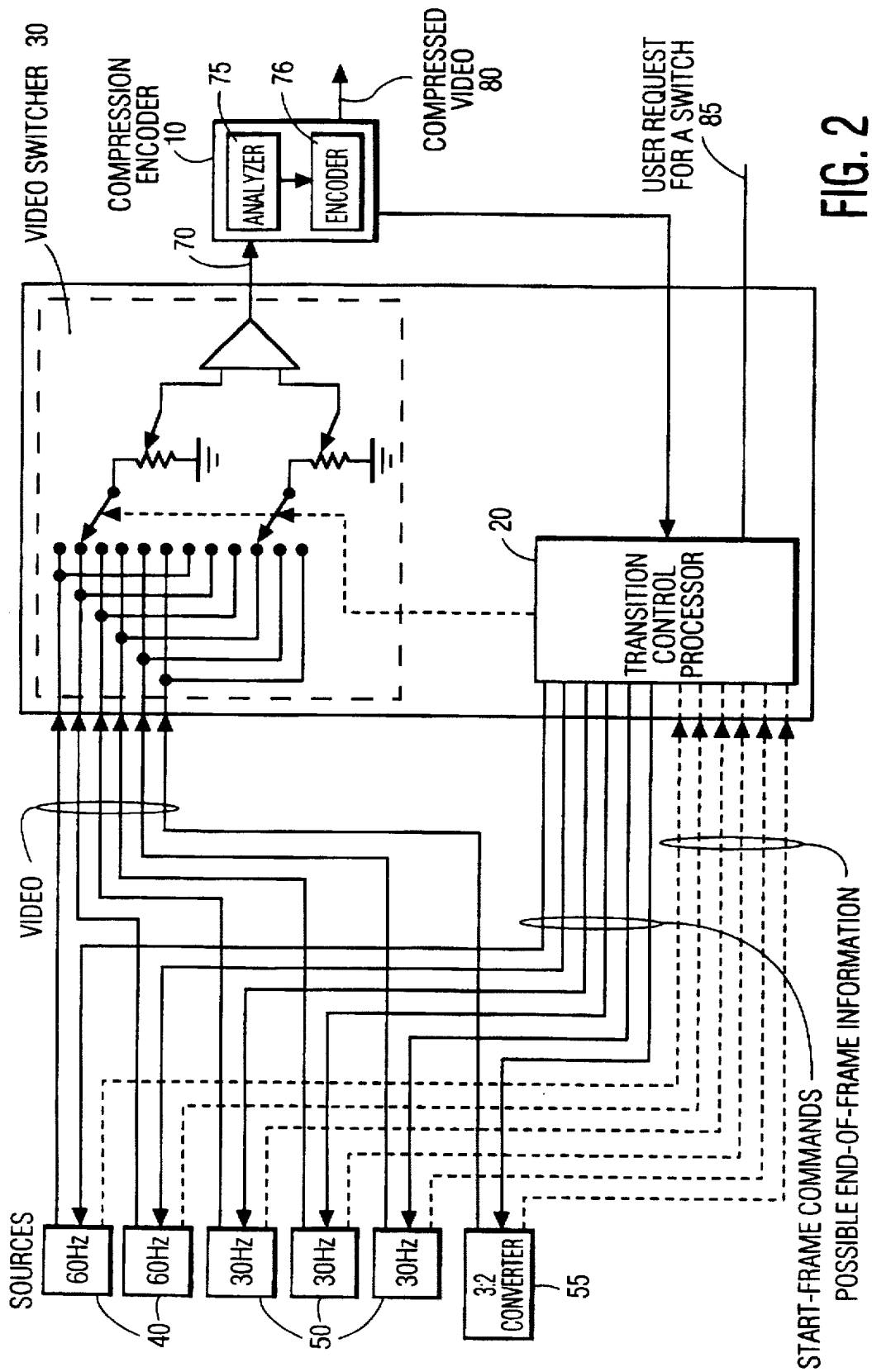
FIG. 2 is a block diagram illustrating an encoding system in accordance with a preferred embodiment of the invention.

FIG. 2 shows a preferred embodiment of the invention. A video compression encoder 10, for example the MPEG-2 encoder contained in the Divicom A8001 program encoder, can be used to produce an MPEG-2 bitstream from a variety of program sources. Using a video switcher 30, program material to the encoder input 70 from sources having a 60-Hz frame rate (40), consisting for example of non-interlaced video presented at a rate of 60 frames per second, sources having a 30-Hz frame rate (50), consisting for example of interlaced video from a standard NTSC camera, and sources having a 24-Hz frame rate (60) consisting for example of filmed motion pictures presented at a rate of 24 film frames per second which has been converted by the 3:2 pull-down process to video via telecine converter 55.

When real-time encoding of digital video takes place in a broadcasting control room, it is necessary for program sources to be switched frequently. For example, when live news programming is presented, commercials originating from film may have to be inserted. If the program material from the source prior to the transition is interlaced, the transition should occur at a point in time when the last field received by the compression encoder 10 is the second of a pair of fields which are to be encoded as a frame picture, or the redundant third field of a three field frame. If the last field is a redundant field, it is ignored by the compression encoder 10, and a transition to a new source can occur before or after the redundant field. If the program material from the source which provides program material after the transition is interlaced, video originating from film and converted to video by telecine converter 55, the first pair of fields input to the compression encoder 10 after the transition should be from one film frame. The instant invention is designed to ensure that the input 70 of compression encoder 10 can be switched among different non-interlaced and interlaced program sources including but not limited to video cameras, 24-Hz film, 30-Hz film and graphics generators without requiring field picture encoding. This design incorporates transition control function into the video switcher 30 such that switching occurs at the preferred times, and by incorporating start-frame functions into interlaced telecines so they begin to present consecutively to the compression encoder 10 (immediately after the transition) at least two fields from the first film frame.

FIGS. 1A and 1B illustrate graphically the limitations placed on currently available multiple program source digital video compression encoders (e.g. MPEG-2).

FIG. 1A represents two possible program sources which can be switched to encoder 10, a first source of video from 30-Hz film which is converted by telecine 50 which is encoded using frame pictures, and a second source of video from the 3:2 pull-down telecine converter 55. The input to the telecine converter 55 is motion picture film at the film rate of 24-Hz. Each field of both program sources is 1/60th of a second, and the fields are demarcated by lines a,b . . . k. In the case of video 100 provided by a telecine 50, each frame P1 through P5, consists of two fields, an odd field A and even field B. In this case, the frames are encoded with field A first. In the case of video 200 from telecine 55 each converted frame T1 through T4, is created from a single film frame of the motion picture by telecine converter 55. The details of the operation of telecine converter 55 will be omitted herein for the sake of brevity. However in brief, each film frame is converted to either two fields (A,B or B,A) or three fields (A,B,A or B,A,B). In this fashion the telecine converter converts the 24-Hz film frame rate to a series of fields 1/60th of a second each. Detailed information on the operation and availability of telecine converters and the 3:2 pull down process is available in the Bender reference incorporated by reference herein and otherwise readily available to those skilled in the television engineering art.

It is necessary to ensure that a transition from a source 50 which provides video 100 to a source 55 which provides video 200 to occur both at the end of one of the frames (P1 ... P5) and at a point in any of the frames T1 ... T4 where at least two sequential fields of any one frame will be the next material to be encoded. Because in frames T1 and T3 one of the fields (A or B) is repeated, only two sequential fields are needed to encode a complete film frame's information. Therefore, as shown by the arrows in FIG. 1A, without the invention, transition from source 50 which provides video 100 to source 55 which provides video 200 can only occur at field boundaries a,g,i and k. These are the only points at which both a complete frame P has been encoded and at least two sequential fields of a complete frame T will be available for encoding. A transition made at boundary c or e would result in only one field of frames T1 or T2 respectively being encoded after transition, thereby yielding incomplete respective frames at the input of encoder 10.

Similarly, as is shown in FIG. 1B, if the transition is to take place from source 55 which provides video 200 to a source 50 which provides video 100, the same considerations must be taken into account in determining the possible transition points. Since the telecine frames T5 and T7 each include three fields, it is necessary to ensure that a transition from source 55 to a source 50 occurs both at a point in any of the frames T5 ... T8 where at least two sequential fields of any one frame have been encoded and at the point where one of the frames (P6 ... P10) begins. Therefore, as shown by the arrows in FIG. 1B, without the invention, transitions from source 55 to a source 50 can only occur at field boundaries l,n,t and v. This enables frame-based encoding without using field pictures. These are the only points at which both a complete frame T has been encoded and both fields of a complete frame P will be available for encoding at the same point in time. A transition made at boundary o, q or s would result in only one field of frames P7, P8 or P9 respectively being encoded after transition, thereby requiring field pictures which are less efficient and require a more complex encoder.

The above discussion of FIGS. 1A and 1B illustrates how there are delays in the transition between different program sources in order to accommodate the need to process complete frames during the encoding process. The invention seeks therefore, to increase the number of possible transition points at which the transitions can take place by controlling the starting point of the source to be activated so that it is ready at the proper moment to supply a complete frame (e.g. at least one A and one B field). That is, the number of transition points are increased without having to resort to the use of field pictures. Of course, if the source to be activated is a 60 frame per second progressively scanned source 40, complete frames are received by the encoder 10 between one vertical interval and the next, and a transition can occur at a point in time when a complete frame from the source prior to the transition has been encoded.

In the apparatus shown in FIG. 2, a transition control processor 20 is used to synchronize the start of a complete frame from a source to be activated, as a result of a transition between sources, so that at least two fields from the first film frame after a transition are input to the encoder 10.

In FIG. 2 the input 70 to the compression encoder 10 can be selected from one of the various program sources, i.e. 60 frame per second source 40, 30 frame-per-second telecine converter source 50, and a 24 frame-per-second telecine converter source 55. In response to a switching signal or start frame command 60 from transition control processor 20, one of the program sources is selected. What typically occurs is a user will request a switch to a different program source by providing a user request at the input 83 of the transition control processor 20. As discussed above, a switch to a second program source cannot occur until after the compression encoder 10 receives a complete frame of information to be encoded as a frame picture (i.e., both fields if the encoder is receiving interlaced video) from the first program source but before the encoder starts to receive any information from a next frame of the first program source. So for example, if the compression encoder 10 is receiving information from a telecine source 55, the encoder 10 must determine when two fields of a two field or a three field frame have been received. In a preferred embodiment, the compression encoder 10 includes an analyzer 75 and an encoder 76. The analyzer 75 receives the input video and stores at least a frame of the input video for comparison to the next incoming field to determine the boundaries between film frames; i.e. it looks for redundancy in three field sequences by calculating the sum of the unsigned differences between corresponding pixels for all pixels in two fields being compared. The compression encoder 10 then provides an allowable-switch-point pulse 84 indicating when at least two fields from a film frame have been received. The allowable-switch-point pulse 84 is provided to the transition control processor 20 which in turn causes video switcher 30 to switch to a different program source. So, for example, with reference to FIGS. 3A–E, assume the input to encoder 10 is the string of fields A–V in FIG. 3E, where A–J are fields from a 24-Hz film source which has been telecine converted by telecine converter 55, and fields K–V are fields from a 30-Hz film source. The encoder provides the allowable-switch-point pulse once the encoder 76 receives a complete picture (as shown in FIG. 3B).

The sources themselves could also provide information to the transition control processor 20 which indicates which fields of a frame have been provided to the compression encoder 10.

Figure 3:
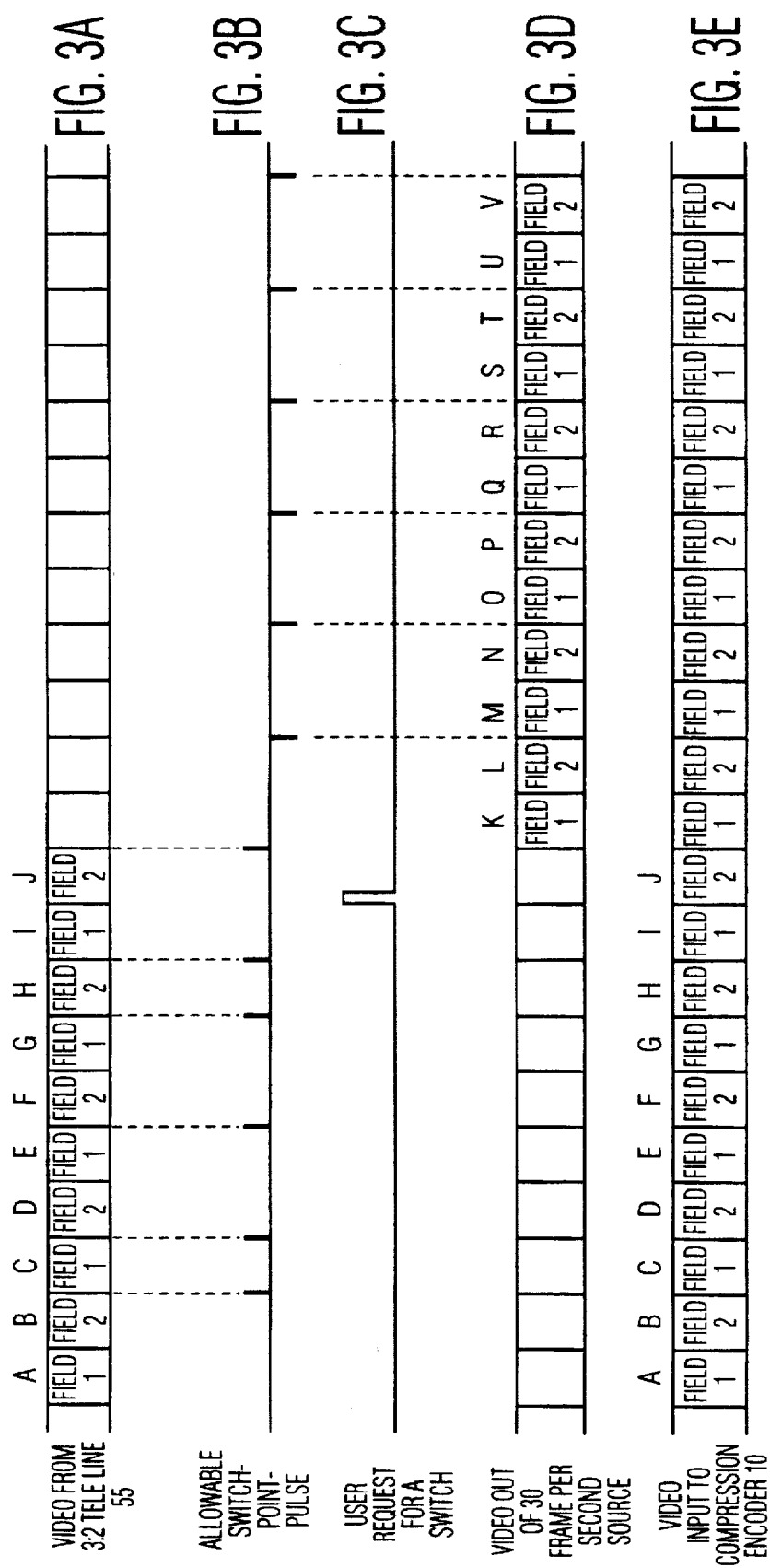
FIG. 3A is a diagram of the video from the 3:2 telecine converted program source which provides video prior to the transition.
FIG. 3B is a waveform of the allowable-switch-point pulses.
FIG. 3C is a waveform of the signal indicating a user's request to switch to a different program source.
FIG. 3D is a diagram of the video from a 30 frame per second source.
FIG. 3E is a diagram of the video out of the video switcher 30.

FIGS. 3A–3E show the relationships between the output of the source that provides video before the transition (FIG. 3A), the allowable switch points (FIG. 3B), the user request-to-switch waveform (FIG. 3C), the output of the source that provides video after the transition (FIG. 3D) and the video that is input to the compression encoder 10 (FIG. 3E). As can be seen from the drawings, when video having 60 fields per second is generated from 24-Hz film, there typically are groups of five fields (fields A–E) in which three consecutive fields (A–C) are derived from one film frame, and the following two fields (fields D and E) are derived from the next film frame. The pattern repeats in the next group of five fields (fields F–J) in which three consecutive fields (fields F–H) are derived from one film frame, and the following two fields (fields I and J) are derived from the next film frame. The first and third field of each group of three fields (e.g. fields A and C) are identical since they are derived from the same film frame.

Fields which represent the starts of new film frames are identified by detecting the redundant fields. This is accomplished by the compression encoder 10 shown in FIG. 4. Video data is continuously written into memory 79 as the video data arrives. Simultaneously, video data that was written two fields earlier is read and compared by comparator 69 with incoming video data on a pixel-by-pixel basis. For example, fields A and B are stored in memory as they arrive at the input 70 of encoder 10. When field C arrives, it is written into memory, and field A is simultaneously read from memory so it can be compared with field C. Since fields A and C are derived from the same film frame, they are found to be identical by comparator 69, and an allowable-switch-point pulse is generated during the vertical interval after field C indicating that a switch to a different program source would be permitted during this vertical interval if a user request to switch were pending. The next two fields (fields D and E).can be assumed to be derived from the second film frame, and an allowable-switch-point pulse is generated during the vertical interval after field E.

The next five fields (fields F–J) form another group of five fields similar to fields A–E. Fields F–H are derived from one film frame. Since field H is a redundant field, it is not needed by the encoding device 76, and an allowable-switch-point pulse is generated during the vertical interval after field G. Field H is found to be identical to field F, and an allowable-switch-point pulse is generated during the vertical interval after field H. The next two fields (fields I and J) are derived from the next film frame, and an allowable-switch-point pulse is generated during the vertical interval after field J. In this case, a user request-to-switch pulse is received during field I. Since there is no allowable-switch-point pulse during the vertical interval after field I, the switch is postponed. There is an allowable-switch-point pulse during the vertical interval after field J, so the switch to another source of video occurs.

For a moving image which originates from 24-Hz film and is continuously converted to interlaced video having 60 fields per second by a telecine converter employing 3:2 pull-down, every fifth field is a repeat of a field that was received ⅖₀ second earlier. Accordingly, an allowable-switch-point pulse should be generated in the vertical interval after the repeat field. Two more allowable-switch-point pulses are generated in the vertical intervals ⅒ second and ⅔₀ second after the repeat field, since these are the points in time when two non-redundant fields derived from each film frame have been received.

Figure 4:
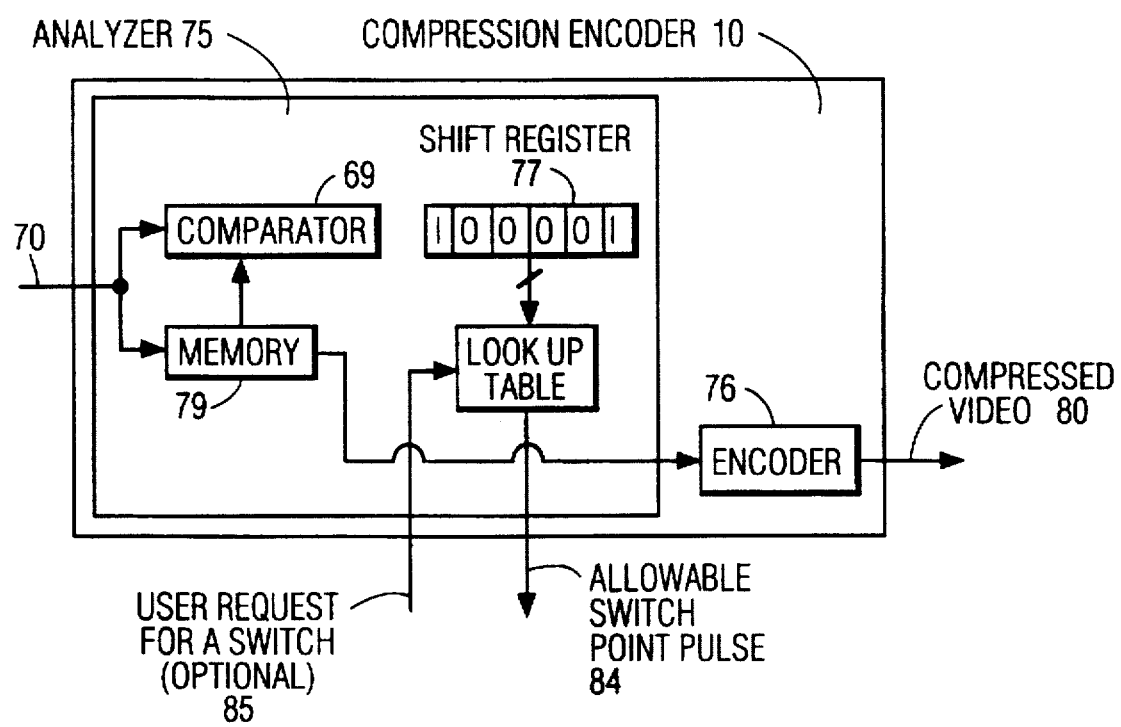
FIG. 4 shows a preferred embodiment of the encoder in FIG. 2.

If there is no motion in the image, there may be additional repeat fields. The compression encoder 10 must select pairs of fields which can be processed as frame pictures. FIG. 4 shows how the compression encoder 10 generates allowable-switch-point pulses for any pattern of repeat fields. Comparator 69 compares each incoming field with the field that was received two fields earlier. A "0" bit provided by the comparator 69 indicates that the comparator 69 determined that the last field it received was not a repeat field. A "1" bit indicates that the field was a repeat field. During the vertical interval at the end of each field the comparator 69 provides a bit to shift register 77 indicating whether the field was a repeat field. Simultaneously, bits previously received by the shift register 77 are shifted to the right. The shift register 77 shown in FIG. 4 holds six bits at a time, although more bits can be stored depending on accuracy requirements.

The contents of the shift register 77 are applied to the inputs of look-up table 74. (The look-up table may have an additional input indicating whether a user request to switch is pending. This is necessary if the encoding device uses this signal when it determines which pairs of fields will be processed together to produce frame pictures.) For various patterns in shift register 77, allowable-switch-point pulses are generated by the look-up table 74. For the pattern shown in the shift register 77 in FIG. 4 (100001), an allowable-switch-point pulse is generated by the look-up table 74 because the pattern of bits in the shift register 77 indicates that the last field received was the repeat field in a three field frame.

The transition control processor 20 receives the allowable-switch-point pulse 84 and checks to see if a user has requested a switch 85 to a different program source. (Alternatively, the transition control processor 20 may only look for an allowable-switch-point pulse 84 after a user has requested a switch 85 indicating a switch in program sources is desired.) As shown in FIG. 3C, a user requested a switch sometime during field I. The transition control processor 20 then waits for the next allowable-switch-point pulse which occurs at the end of field J to switch to the second source. In this example, a switch is being made to a 30-Hz film source 50. The transition control processor 20 switches, via video switcher 30, the program source which is to be provided as the input to the compression encoder 10. At this same time transition control processor 20 sends a signal to the selected 30-Hz film source 50 telling it to begin providing a new film frame to compression encoder 10. That is, the film source 50 must begin to provide information to the encoder 10 at a point where all the fields required to produce a complete image are the next fields to be input to the compression encoder 10. The second source cannot begin by providing the last field of one film frame and the first field of the next frame.

Although the preferred embodiment requires the compression encoder 10 to determine when frames of video have been received in order to indicate to the transition control processor 20 when an allowable switch can occur, in an alternative embodiment of the invention the program source itself will provide a signal 62 indicating to the transition control processor 20 when two fields of a complete frame have been provided to the compression encoder 10. Although the analyzer 75 cannot use the method described above to detect frame boundaries in video from 30-Hz film because there are no repeat fields, the source itself can easily provide a signal indicating when new source frames begin. Assuming that the first field is an "A" field, then an allowable-switch-point pulse will be generated after any "B" field. At this point, if a user has selected a transition to another program source, the transition control processor 20 will cause the video switch 30 to select the new program source without the need for a signal from the compression encoder 10.

Once a transition occurs, the new program source, e.g., 30-Hz film source 50, must start providing video from a complete film frame immediately after it receives a start command from transition control processor 20. As stated above, either the transition control processor 20 could receive end of frame or allowable-switch-point pulses from the new program source so as to synchronize the encoding process to the source, or if frame-boundary information is not available from the source, then the encoder 10 itself can analyze the video it is receiving to derive the frame boundary information.

Once a 24-Hz film source 55 or a 30-Hz film source 50 receives a start command 63 from transition control processor 20 it must begin providing all of the information for a complete frame. One way to do this would be to mechanically control advancement of the film once a start command is received from the transition control processor 20 so that at least two fields from the first film frame are generated after the start command.

In a flying-spot telecine such as the Rank Cintel Mark 3, all video data is stored in solid-state memory after it is read from film. Output video is synchronized to reference sync by reading the appropriate memory locations required to produce the video levels that must be output at any point in time. This ensures that field 1 of the output video is synchronized to field 1 of reference sync. A telecine converter could be created which would on-command provide two fields from one film frame after a start command on any 60-Hz boundary.

Normally, film is transferred to video tape, and tape is played on the air. For this kind of operation, frame-start pulses could be recorded on the tape in the vertical interval, on a linear track or by other means, and a single start-frame pulse from the switches could be used to control the VTR by a method like the one described above. In a system in which an editor is used, the editor might perform all the functions performed by the transition-control section of the video switcher in the description above.

It will thus be seen that the objects set forth above, among those made apparent from the preceding description, are efficiently attained and, since certain changes may be made in the above construction without departing from the spirit and scope of the invention, it is intended that all matter contained in the above description as shown in the accompanying drawings shall be interpreted as illustrative and not in a limiting sense.

It is also to be understood that the following claims are intended to cover all of the generic and specific features of the invention herein described and all the statements of the scope of the invention which, as a matter of language, might be said to fall therebetween.

What is claimed is:

1. A method of switching an input of an encoder from a first program source to a second program source, comprising the steps of:

receiving, at the input of the encoder, video information from the first program source which video information includes a plurality of images wherein each image is included within a frame of information and each frame is defined by a plurality of fields each field being separated by a vertical interval and wherein a frame includes one of i) the fields which will be used to create an encoded frame picture, and ii) the fields which will be used to create an encoded frame picture plus a redundant field;

determining when the fields which will be used to create an encoded frame picture have been received by the encoder and when a redundant field has been received by the encoder;

providing allowable-switch-point pulse for indicating when the fields which will be used to create an encoded frame picture have been received by the encoder, such that if a received frame includes a redundant field the allowable-switch-point pulse is provided in the vertical interval which occurs immediately after receipt of the fields of the frame which will be used to create an encoded frame picture and in the vertical interval which occurs immediately after the redundant field;

switching the input of the encoder to the second program source after the next occurring allowable-switch-point pulse which follows a user's request for a switch to the second program source; and providing consecutively after switching to the second program source, two fields of video information from the second program source which will be used to create an encoded frame picture.

2. The method in accordance with claim 1, wherein two fields are used to create a frame picture and a frame from the first program source includes one of i) a first field and a second field, and ii) a first field, a second field, and a redundant field which is a duplicate of the first field, and wherein for a frame which includes three fields, the allowable-switch-point pulse is provided in the vertical interval immediately following the second field and in the vertical interval immediately following the redundant field.

3. The method in accordance with claim 2, wherein the step of providing the allowable-switch-point pulse includes the following steps performed repeatedly by the encoder:

receiving each field;

comparing each received field to a field received two fields earlier;

providing a bit to a memory device which indicates if the received field is redundant to the field received two fields earlier;

storing a plurality of the bits in the memory device for a plurality of received fields such that a pattern of bits is formed in the memory device; and applying the pattern of bits to the input of a look up table, wherein the look up table includes an entry for each possible pattern such that for a pattern which indicates either one of i) a redundant field was last received; and ii) consecutively a first field and a second field were last received, the entry will cause an allowable-switch-point pulse to be generated.

4. The method in accordance with claim 1, wherein the step of providing the allowable-switch-point pulse is performed by the first program source and includes the following steps:

determining when two fields which will be used to create an encoded frame picture have been provided to the encoder; and providing an allowable-switch-point pulse when two fields which will be used to create an encoded frame picture have been provided to the encoder.

5. The method as claimed in claim 1, wherein the step of encoding performs encoding in accordance with MPEG-2.

6. The method as claimed in claim 1, wherein the first program source provides telecine converted video wherein the frames alternate between frames including:

i) three fields wherein a first and a third field include the same video information and wherein the second field and one of the first and third fields will be used to create an encoded frame picture, and ii) two interlaced fields, and wherein the step of providing an allowable-switch-point pulse provides an allowable-switch-point pulse a) in the vertical interval after the second field in the three field frames b) in the vertical interval after the third field in the three field frames, and c) in the vertical interval after the second field in the two field frames.

7. An encoding system for increasing the frequency at which a transition from receiving video information from a first program source to a second program source can occur wherein the first and second program sources provide interlaced video, comprising:

an encoder for encoding video information received from the program sources which video information includes a plurality of images wherein each image is included within a frame of video information and each frame is defined by a plurality of fields each field being separated by a vertical interval and wherein a frame includes one of i) the fields which will be used to create an encoded frame picture, and ii) the fields which will be used to create an encoded frame picture plus a redundant field;

an end-of-frame indicating device for providing an allowable-switch-point pulse each time all the fields which will be used to create an encoded frame picture have been received by the encoder, such that if a particular received frame includes a redundant field, which is a duplicate of a field in the received frame, the end-of-frame indicating device will provide an allowable-switch-point pulse after receiving all of the fields of the particular frame which will be used to create an encoded frame picture and after the redundant field;

an input for receiving a user request indicating a desire to transition from the first program source to the second program source;

a switch for switching to the second program source upon receipt of a user request followed by an allowable-switch-point pulse, and wherein the second program source includes a device for i) detecting a user request which is followed by an allowable-switch-point pulse and ii) for initially providing to the encoder consecutively upon such detection two fields of information which will be used to create an encoded frame picture.

8. The system as claimed in claim 7, wherein the first program source includes the end-of-frame indicating device.

9. An encoding system for switching from receiving video information from i) a program source which provides 3:2 telecine converted full motion video information in a sequence which alternates between three field frames, wherein the third field of a three field frame is a redundant field having the same information as the first field of the three field frame, and a video frame having two fields, to ii) a second program source, the system comprising:

an encoder for encoding information received from the program sources;

a comparator for receiving the fields and for comparing the received fields to a previously received field to determine if a received field is a redundant field and for each field providing a redundant field signal which indicates which fields are redundant fields;

an allowable-switch-point pulse generator for receiving the redundant field signal and for providing an allowable-switch-point pulse when 1) two fields have been received and are to be encoded as a frame picture and neither field is a redundant field and 2) after a redundant field has been received;

a device for receiving a user request to switch to the second program source;

a switch for switching to the second program source; and a controller for causing the switch to switch upon receipt of an allowable-switch-point pulse which occurs after the user request.

10. An encoding system for switching from receiving video information from i) a first program source which provides 3:2 telecine converted full motion video information in a sequence of three fields per frame and two fields per frame wherein the third field of the three field frame is a redundant field, to ii) a second program source, the device for switching comprising:

an encoder for encoding information received from the program sources;

a comparator for a) receiving the fields, b) comparing the received fields to a previously received field, c) detecting if a received field is a redundant field, and d) providing a redundant field signal upon detection of a redundant field, the redundant field signal indicating when two fields which are to be encoded as a frame picture have been received by the comparator and when a redundant field has been received by the comparator;

a detector for detecting the redundant field signal and for providing an allowable-switch-point pulse which indicates when 1) two fields have been received and are to be encoded as a frame picture, and 2) a redundant field has been received by the comparator;

a device for receiving a user request to switch to the second program source;

a switch for switching to the second program source;

a controller for causing the switch to switch upon receipt of an allowable-switch-point pulse after the user request; and a frame start device included within the second program source which causes, after the switch switches to the second program source, the second program source to initially provide consecutive fields of information which are to be encoded as a frame picture.

11. The device as claimed in claim 10, wherein the second program source is a 30-Hz film source which initially provides after the switch switches to the second film source a first field and then a second consecutive field of a frame of information.

12. The device as claimed in claim 10, wherein the second program source provides 3:2 telecine converted video which initially provides after the switch switches to the second program source one of a) a first field and then a second field of a three field frame;

b) a second field and then a third field of a three field frame; and c) a first field and then a second field of a two field frame.

13. A device for switching from receiving video information from i) a first program source which provides 3:2 telecine converted full motion video in a sequence of three fields per frame and two fields per frame wherein the third field of the three field frame is a redundant field to ii) a second program source which provides non-interlaced video, comprising:

an encoder for encoding information received from the program sources;

an analyzer for receiving the fields and for determining 1) when a field is a redundant field of a particular frame and 2) when two fields which are to be encoded as a frame picture have been received, and further including an allowable-switch-point pulse generator for generating an allowable-switch-point pulse when a field is a redundant field of a particular frame and when two fields which are to be encoded as a frame picture have been received;

a device for receiving a user request to switch to the second program source;

a switch for switching to the second program source; and a controller for causing the switch to switch to the second program source upon receipt of an allowable-switch-point pulse after the user request.

14. A method of switching an encoder in an encoding system from receiving video from i) a first program source which provides 3:2 telecine converted full motion video in a consecutive sequence of frames having three fields per frame and frames having two fields per frame wherein the third field of the three field frame is a redundant field and each frame is separated by a vertical interval, to ii) a second program source, comprising the steps of:

receiving video information from the first program source;

comparing each field to a field received two fields earlier;

detecting a redundant field in a three field frame;

providing a redundant field signal when a redundant field is detected;

receiving a user request to switch to the second program source;

providing an allowable-switch-point pulse when a) two fields which will be used to create an encoded frame picture have been received and no redundant field signal has been provided for either field and b) after a redundant field signal has been provided; and switching to the second program source upon receipt of an allowable-switch-point pulse after the user request.

15. The method as claimed in claim 14, wherein the second program source is a 30-Hz film source and the method further includes the step of:

providing, initially, after the switch to the second program source, a first field and a second consecutive field of a frame of information from the second program source.

16. The method as claimed in claim 14, wherein the second program source also provides 3:2 telecine converted full motion video and the method further includes the step of providing initially after the switch switches to the second program source one of:

a) a first field and then a second consecutive field of a three field frame;

b) a second field and then a third consecutive field of a three field frame; and c) a first field and then a second consecutive field of a two field frame.

17. A method of switching an encoder in an encoding system from receiving video from i) a first program source which provides 3:2 telecine converted full motion video in a consecutive sequence of frames having three fields per frame and frames having two fields per frame wherein the third field of the three field frame is a redundant field, to ii) a second program source which provides non-interlaced video, comprising the steps of:

receiving video information from the first program source which video information includes a plurality of images, each image is defined by a frame of information, and wherein each field is separated by a vertical interval;

comparing each field to the field received two fields earlier;

detecting the redundant fields in the three field frames;

providing a redundant field signal when the redundant fields are detected;

receiving a user request to switch to the second film source;

providing an allowable-switch-point pulse when a) two fields which will be encoded as one frame picture have been received, and b) after a redundant field signal has been provided;

switching to the second program source upon receipt of an allowable-switch-point pulse after the user request; and providing initially after the switch switches to the second program source a non-interlaced frame of video information from the second program source.

18. A device as claimed in claim 9, wherein the comparator includes a redundant field signal device for providing a redundancy bit having a first value if the field received is a redundant field and a second value if the field received is not a redundant field;

and wherein the allowable-switch-point pulse generator includes:

a memory device for storing the redundancy bits for a plurality of received fields; and a look up table for receiving as an address the stored redundancy bits and including for each address corresponding to a particular pattern of redundancy bits stored in the memory device a bit indicating whether an allowable-switch-point pulse should be generated.

19. An encoding system for switching an input of the encoding system from i) a first program source which provides 3:2 telecine converted full motion video information in a sequence which alternates between three field frames, wherein the third field of a three field frame is a redundant field having the same information as the first field of the three field frame, and a video frame having two fields, to ii) a second program source, the system comprising:

a comparator for receiving the fields and for comparing the received fields to a previously received field to determine if a received field is a redundant field and for setting a redundancy bit upon detection of a redundant field;

a memory device including a plurality of storage units for storing as a pattern the redundancy bits for a plurality of received fields;

a look up table having a plurality of address inputs for receiving the pattern of stored bits, and for each address location which corresponds to the pattern of the stored bits the look up table having an entry which indicates one of i) an allowable-switch-point pulse should be generated because two fields have been received and compared which will be used to create an encoded frame picture and no redundancy bit has been set for either field, ii) an allowable-switch-point pulse should be generated because for the last field received a redundancy bit was set, and iii) an allowable-switch-point pulse should not be generated;

a device for receiving the entry and for providing an allowable-switch-point pulse if so designated by the entry;

a device for receiving a user request to switch to the second program source;

a switch for switching the input to the second program source; and a controller for causing the switch to switch upon receipt of an allowable-switch-point pulse which occurs after the user request.

20. An encoding system for increasing the frequency at which a transition from a first program source which provides non-interlaced video to a second program source which provides interlaced video can occur, the system comprising:

an encoder for encoding video information received from the program sources;

an end-of-frame indicating device for detecting the vertical intervals in the non-interlaced video and for providing an allowable-switch-point pulse in the vertical intervals;

an input for receiving a user request indicating a desire to transition from the first program source to the second program source;

a switch for switching the encoder to receive video information from the second program source upon receipt of a user request followed by an allowable-switch-point pulse; and wherein the second program source includes a device for i) detecting a user request followed by an allowable-switch-point pulse and ii) for initially providing to the encoder consecutively, upon such detection, two fields of video information which will be used to create an encoded frame picture.

21. An encoding system for increasing the frequency at which a transition from receiving video information from a first program source to a second program source can occur wherein the first and second program sources provide interlaced video, comprising:

an encoder for encoding video information received from the program sources which video information includes a plurality of images wherein each image is included within a frame of video information and each frame is defined by a plurality of fields each field being separated by a vertical interval and wherein a frame includes one of i) the fields which will be used to create an encoded frame picture, and ii) the fields which will be used to create an encoded frame picture plus a redundant field;

an end-of-frame indicating device for providing an allowable-switch-point pulse each time all the fields which will be used to create an encoded frame picture have been received by the encoder;

an input for receiving a user request indicating a desire to transition from the first program source to the second program source;

a switch for switching to the second program source upon receipt of a user request followed by an allowable-switch-point pulse, and wherein the second program source includes a device for i) detecting a user request which is followed by an allowable-switch-point pulse and ii) for initially providing to the encoder consecutively upon such detection two fields of information which will be used to create an encoded frame picture.

22. The system as claimed in claim 21, wherein the first program source includes the end-of-frame indicating device.

* * * * *